Patented Aug. 13, 1940

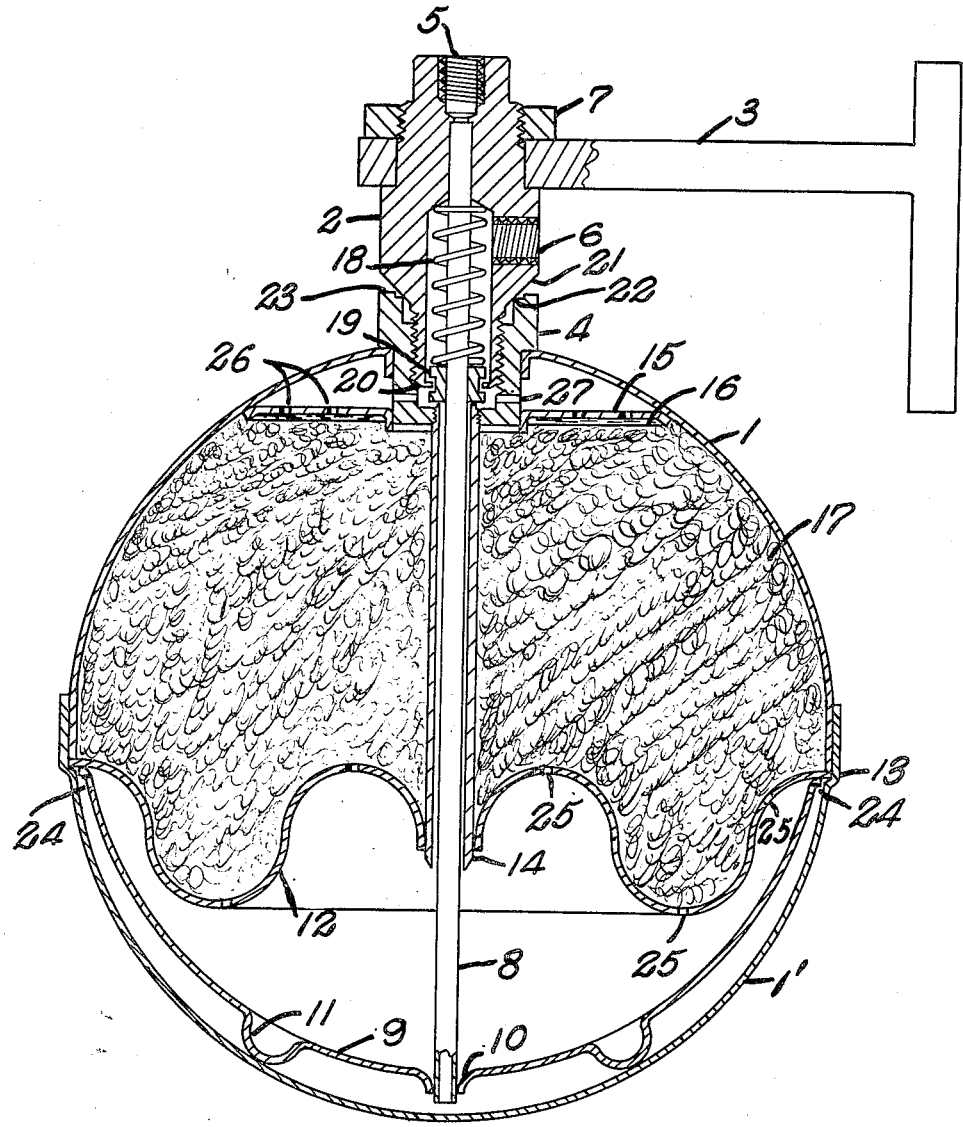

2,211,305

UNITED STATES PATENT OFFICE 2,211,305

OIL FILTER

John F. Werder, Lakewood, Ohio

Application May 27, 1940, Serial No. 337,528

10 Claims. (Cl. 210—131)

This invention relates to oil filters of the replaceable type such as are now used on automobiles, trucks, busses, aeroplanes, etc. This application is a refile for abandoned application, Serial No. 160,458 for an Oil filter, filed August 23, 1937.

One of the objects of the present invention is to provide a filter which can be easily and quickly changed when the filtering element therein becomes clogged or full of foreign matter, such change to be made without disconnecting any tubes or clamps.

Another object is to make a filter which is burst proof and, at the same time, very inexpensive and easily assembled.

A still further object is to make a filter which filters in two separate ways. In one way a large volume of cold or hot oil is always filtered roughly, i. e. any large particles of foreign matter are separated through settling and/or centrifugal force. A smaller portion of this same oil is given a very thorough cleaning, particularly after the filter becomes warm. A unique method of heating the filter by the oil itself is employed to assist in the filtering of this smaller quantity.

Still further objects will appear from the following description and claims when considered with the accompanying drawing.

Most filters now in use on motor vehicles are attached to the dashboard or the motor itself with the removable clamp. Inlet and outlet tubes then carry the oil from the motor through the filter and return it to the crankcase. After a few thousand miles running all filters become clogged with foreign matter so that they are of little if any value thereafter. With the type filter mentioned above it is necessary to disconnect the inlet and outlet tubes, then loosen the bracket and take out the old filter. A new filter is then put in place, the clamp tightened, and the inlet and outlet tubes again connected. All of this required considerable time and often difficulties are encountered in attaching the inlet and outlet connections and a leak may develop. However, with proper fittings and sufficient time a satisfactory connection can be made.

There are also filters of the replaceable cartridge type now on the market in which the inlet and outlet connections are not disturbed but a large cover on top of the filter is removed, the old cartridge pulled out and the new one installed. The cover is then drawn up tightly with one or more screws against a gasket. The opening on this type of filter is necessarily large and difficulties have been encountered with oil leaking out around the gasket. Any such leakage is, of course, very serious because the pressures on the oiling system of modern engines is relatively high and it does not take long for even a small leak to completely drain the crankcase and ruin the motor.

In removing the filters or changing the cartridge on either of the above the jobs should be done by a skilled mechanic although I am aware that some car owners make these changes themselves.

In my filter the change is accomplished simply by unscrewing the old filter and screwing a new one on in its place. Anyone who can change a spark plug can change my filter in a few seconds time.

The single figure is a diagrammatic view of my device attached to its bracket.

Numerals 1 and 1' represent the two halves making the spherical shell or case.

2 is the motor fixture and 3 is the bracket to hold same on the dash or motor.

4 is the screw connection permanently attached to the case. 5 is the inlet and 6 the outlet. 7 is a lock nut for holding motor fixture to bracket.

8 is the inlet tube permanently secured on motor fixture on one end, the other end entering into false bottom 9 through a torn hole 10 which is a rather snug fit around tube 8.

11 represents three or four feet to hold false bottom off the very bottom of the filter case.

12 is a diaphragm or partition which in the illustration is located at the seam 13.

14 is a tube fitting loosely around 8 but soldered to partition 12 at the point of juncture and also held securely in body 4 at the other end.

15 is a partition attached to the meter shell or case at the outer edges and tightly fitting body 4.

16 is a piece of filter cloth, paper, Canton flannel, fine wire screen or other suitable porous material placed directly below the holes in partition 15.

17 is the filtering medium itself which can be string, cloth, steel wool, rags, paper, felt, waste or another other suitable material.

18 is a spring located in fixture 2 to hold automatic valve 19 on its seat which is one end of tube 14.

20 represents three or four hooks which allow valve 19 to move but keep it from falling out when the filter is changed.

21 is a bevelled seat on fixture 2 which cooperates with the sharp seat 22 of the body 4 to form a tight seal without the aid of gaskets.

23 is a small projection of the body 4 which is left as a protection to seat 22 in shipping and handling.

24 is perforations or openings around the upper end of partition 9. They are many and large, to slow up speed of incoming liquid. 25 are openings in partition 12 and 26 similar openings in partition 15.

27 are cross holes in body 4 to permit oil to flow from holes 26 around valve 19 and spring 18 and out of 6.

In the past it has generally been the practice to connect filters up to a small by-pass in the oiling system of an automobile. Sometimes the oil from this by-pass after going through the filter goes directly into the crankcase and at other times it is used to lubricate valve mechanisms or other parts. Occasionally straight through filters are used. That is, all of the oil delivered by the oil pump is forced through the filter and then carried direct to the bearings and other parts of the motor. This last mentioned installation, however, has not been very generally accepted by the industry due to the danger of the filter plugging and cutting off the flow. The same difficulty can happen with by-pass filters that supply oil to valve mechanisms. I am aware that check valves have been used in filters for the purpose of assuring a certain amount of oil always travelling through the filter. However, these check valves are usually concealed for convenience in manufacture and it is very difficult for the service man or car owner to know whether they are functioning or not. This is probably the reason why this straight through filter has never been very widely used.

In filters employing a check valve no provision whatever is made to filter the oil passing through this check valve. In my filter it will be noted that any oil passing through it is at least partially filtered even though it does not go through the filtering medium at all.

It is exceedingly difficult to filter cold oil. Most filters are practically inoperative until they become warm through the heat of the engine or radiator. In cold weather and on short runs most filters do not function at all. In my filter provision is made for heating the entire contents very quickly by utilizing the oil itself.

Due to the unique construction of my filter it can very safely be used as a straight through filter although it will function very well when employed as a by-pass filter. I will now explain the operation of my filter in detail.

Oil enters through the fixture 5, comes down through tube 8 and flows in the space between the false bottom 9 and the bottom 1'. After filling up this cavity it comes out of holes 24 and fills the inside sludge reservoir and then starts through holes 25 through the filtering medium and out through the tube partition into holes 27 around valve 19 and spring 18 and out of opening 6.

If the oil is cold and thick or for any reason it cannot flow through filtering medium readily it passes between tubes 14 and 8 and lifts valve 19 which permits it to flow out of 6. As the oil entering the filter becomes heated it immediately heats the filter from the very bottom which will soon make the oil in the sump of the filter as warm as itself. This oil in passing through openings 24 flows extremely slowly because the total area of these openings is considerably more than the area of the pipe 8. While this oil is flowing slowly any large particles of foreign matter will be dropped on top of the false bottom. Smaller particles that may flow along with the general stream of oil will be thrown out when passing the sharp corners on tube 14. The channel lying between tubes 14 and 8 is so calculated that the velocity of the oil in this point is rather high. That means that the oil flowing along the under side of the partition 12 will make a sudden turn in its direction which I find is very effective in dropping out particles of foreign matter.

In a short time this warm oil flowing through that portion of the filter lying below diaphragm 12 will heat the filtering medium 17 together with any oil that may be already in there. This warm oil is easy to filter and any good filtering medium used will soon clean all of the oil in the crankcase.

The action of valve 19, is, of course, entirely automatic and can be set for any desired pressure.

To change the filter it is only necessary to unscrew fitting 4, slip the old cartridge off and put on a new one. Tube 8 remains on the motor fixture which keeps down the cost of the replaceable filter element itself.

My spherical case is extremely cheap to manufacture and at the same time provides a very strong container. For example, a four inch ball made out of any light thin plate and soldered at the joint will withstand pressures of over five hundred pounds without noticeable distortion. Expensive welded containers used by other filter manufacturers will not stand any such pressures and, of course, the cost on my design is but a fraction of what these other types cost.

I do not wish to limit my disclosure to the exact example shown on the enclosed drawing. Many changes would readily suggest themselves to anyone familiar with the art and it is understood that this drawing is merely one example utilizing my invention.

For example, diaphragm 12 does not have to be corrugated and can be made in the shape of a semi-spherical cone or perfectly flat washer. Likewise it does not have to be located at the side seam but can be placed either above or below.

While my duplex coupling 4 is very convenient in that it permits a quick change of the filter it is obvious that the inlet connection could be made at the bottom of the case between the false bottom and the case proper. In this construction, tube 8 would be eliminated and a shorter piece of solid rod substituted. Openings 5 and 10 would of course be omitted.

It will be noted that, in my filter, any oil in the sump is heated by the incoming oil from the motor. This is very important for the rough filtering I mention earlier in this application. I shall explain the reasons. Suppose filter has been in operation on a car for some time. The oil in the sump will have considerable foreign matter in it and such oil, when cold, will weigh, let us say eight pounds per gallon. Hot oil coming from the motor, even though containing as much dirt as the oil in the sump, will weigh less, perhaps it will weight but six pounds. It is very difficult for this lighter oil to drop the smaller particles of dirt into the heavier mass in the sump. If the sump oil is heated to nearly the same as the incoming oil, a very good settling can take place.

Another advantage of my design is that the incoming oil washes under the holes 25 in partition 12, whenever valve 20 is off its seat and so dislodges any dirt that may be there. Such washing action is very pronounced when cold oil goes through the filter. These larger particles of dirt are then dropped when the oil makes the sharp turn around tube 14.

I find, particularly in this type of filter, that steel wool makes a very satisfactory filtering medium. Of course, any metal wool can be used. Copper, for example, is advantageous because it will not rust. Any metallic wool has the advantage of not disintegrating through heat or age and is not subject to the rot that sometimes occurs when cloth is used.

I do not wish to limit my invention to the exact example herein set forth but what I do claim is:

1. In a filter, a case, inlet means located at the bottom, outlet means located near the top, cup shaped partition means located above said inlet means to divert the flow of incoming liquid to the outer walls of said case and form a sump for the accumulation of dirt, a perforated partition located above said cup shaped partition, a second perforated partition located below said outlet means, tubular means passing through one perforation in each of said perforated partitions, filtering means located between said perforated partitions and about said tubular means, a spring loaded valve restricting said tubular means so as to force a portion of the fluid passing through said filter.

2. In a filter mounting bracket, a block, a central hole clear through said block, one end of said hole enlarged, threads on the outside of said block surrounding said enlarged end of hole, a circular seat adjacent to said threads, said threads and seat being on the same axis as said central hole, a tube located in said central hole forming an annular cavity between itself and said enlarged portion, a side hole in said block forming a communicating channel with said annular cavity, a spring surrounding said tube and located within said cavity, a sliding collar located on said tube and loaded by said spring, means for establishing tubular connections to said central hole and said side holes.

3. In a filter mounting bracket, a block, a central hole clear through said block, one end of said hole enlarged, threads on the outside of said block surrounding said enlarged end of hole, a circular seat adjacent to said threads, said threads and seat being on the same axis as said central hole, a tube located in said central hole forming an annular cavity between itself and said enlarged portion, a side hole in said block forming a communicating channel with said annular cavity, a spring surrounding said tube and located within said cavity, a sliding collar located on said tube and loaded by said spring, means for establishing tubular connections to said central hole and said side holes, said collar being of smaller diameter than said enlarged end of said central hole so as to leave a fluid passage into said annular cavity.

4. In a filter, a mounting bracket, a block, a central hole clear through said block, one end of said hole enlarged, threads on the outside of said block surrounding said enlarged end of hole, a circular seat adjacent to said threads, said threads and seat being on the same axis as said central hole, a tube located in said central hole forming an annular cavity between itself and said enlarged portion, a side hole in said block forming a communicating channel with said annular cavity, a spring surrounding said tube and located within said cavity, a sliding collar located on said tube and loaded by said spring, means for establishing tubular connections to said central hole and said side holes, said collar being of a smaller diameter than said enlarged end of said central hole so as to leave a fluid passage into said annular cavity; a filter case with one opening, secured in said opening, a threaded thimble with a circular seat adjacent to said threads, said seat and threads cooperating with said seat and threads on said mounting bracket to establish a tight seal, a central hole located in the end of said thimble and on a projected axis of said seat and threads, side holes located between said central hole and said circular seat and communicating with the inside of said case, a second tube located in said central hole in thimble and of larger diameter than said tube in bracket, filtering means surrounding said second tube so that fluid must pass through said filtering means in order to reach said side holes in said thimble, said second tube cooperating with said sliding collar to form a flexible connection therewith.

5. In a filter, a case, a cup shaped false bottom inside said case with openings around the upper rim thereof, means for holding said false bottom rigidly away from case so as to provide a liquid space between the inside bottom of said case and said false bottom, a perforated partition in said case located above said false bottom, a second perforated partition located above said first partition, tubular means passing through one perforation in said second partition and extending downward and terminating in a sharp edge after passing through one perforation in said first partition, filtering means located between said perforated partitions, inlet means communicating with said liquid space between said false bottom and case, outlet means communicating with space between said second partition and top of case, a spring loaded valve restricting said tubular means so as to force a portion of fluid through said filtering means.

6. In a filter, a case, inlet and outlet means attached to said case, a cup shaped partition located inside said case and surrounding said inlet means so that the inside of said cup shaped partition forms a sump and the outside forms a baffle directing the incoming liquid to the outer portions of the inside of said case, a perforated partition located above said cup partition, a second perforated partition surrounding said outlet means, a tube passing through both perforated partitions forming a fluid channel between the space between said cup partition and first perforated partition and said outlet means, filtering means located between said perforated partitions, spring loaded valve means restricting said tubular means so as to force a portion of the fluid passing through filter through said filtering means.

7. In a filter, a casing with one opening, a threaded thimble having a circular seat adjacent to said threads and a central hole and an off center hole in the closed end thereof secured in said opening, a tube located in said central hole in said thimble and extending into said casing, filtering means surrounding said tube, so that fluid entering said tube must pass through said filtering means in order to reach said off center hole in thimble, threaded connecting means adapted to cooperate with said thimble to establish inlet flow through said central hole and outlet flow through said off center hole.

8. In a filter, two semi-spherical halves permanently joined together to form a complete sphere with a single opening therein, a threaded thimble having a circular seat adjacent to the threads and a central hole and off center holes in the closed end thereof secured in said opening, a tube mounted in said central hole and extending into said sphere, filtering means located about said tube so that fluid passing through said tube will flow through said filtering means and come out through said off center holes, threaded connecting means adapted to cooperate with said thimble to establish inlet flow through said central hole and outlet flow through said off center holes.

9. In a filter, a casing with one opening, a threaded member with a counterbore extending beyond the base of said threads and ending in a perforated wall and with a seat adjacent to said threads secured in said opening, tubular means secured in one of said perforations and extending to the inside of said casing, filtering means inside said case and surrounding said tubular means so that fluid entering through said perforation and tubular means passes through said filtering means and comes out through the other perforations, threaded connecting means adapted to cooperate with said threaded member to establish inlet flow through said tube perforation and outlet flow through said other perforations.

10. In a filter, a casing with one opening, a threaded member with a counterbore extending beyond the base of said threads and ending in a wall having a central hole and an off center hole therein and with a seat adjacent to said threads secured in said opening, tubular means secured in said central hole, a seat on one end of said tubular means and the other end extending to the inside of said casing, filtering means inside said case and surrounding said tubular means so that fluid entering through said tubular means passes through said filtering means and comes out through said off center hole, threaded connecting means adapted to cooperating with said thimble to establish inlet and outlet flow through said filter, spring loaded valve located inside said threaded connecting means cooperating with said seat on tube so as to force incoming fluid through said filtering means.

JOHN F. WERDER.